F. W. COLBY.
Building-Blocks.
No. 143,809. Patented Oct. 21, 1873.
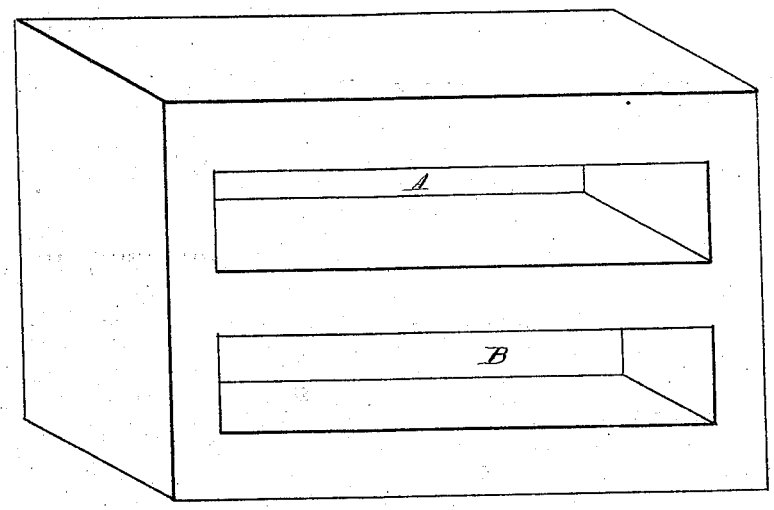
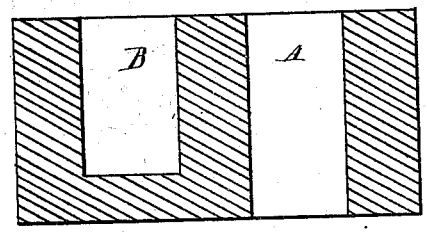
Witnesses
J. B. Connolly
A. Connolly
Inventor
Francis W. Colby
by Connolly Bro's
Att'ys

UNITED STATES PATENT OFFICE.

FRANCIS W. COLBY, OF STREATOR, ILLINOIS.

IMPROVEMENT IN BUILDING-BLOCKS.

Specification forming part of Letters Patent No. 143,809, dated October 21, 1873; application filed April 11, 1873.

*To all whom it may concern:*

Be it known that I, FRANCIS W. COLBY, of Streator, in the county of La Salle and State of Illinois, have invented certain new and useful Improvements in Building-Tile; and I do hereby declare that the following is a full, clear, and exact description thereof, that will enable others skilled in the art to which it appertains to make and use the same, reference being had to the accompanying drawings and to the letters of reference marked thereon, which form a part of this specification.

In the drawings, Figure 1 is a perspective view, and Fig. 2 a vertical longitudinal section, of my invention.

This invention has relation to hollow building-tiles; and consists in the novel construction and arrangement of the cells, as hereinafter described.

The tile is made of artificial-stone composition, of any desirable size, and preferably of an oblong rectangular form, as shown. The tile has two cells, A B, running lengthwise thereof. The inner cell is open at the top and bottom, and when the wall is built, the inner cells form continuous passages or flues for the passage of heat or heating-pipes. In some of the tiles openings may be made in the side of the cells A for heat-registers. The outer cell is provided with a bottom of about equal thickness with the sides. This bottom serves as a brace to strengthen the tile and prevent the wall from being injured by moisture.

When the building is to be heated by furnaces or heaters a very small hole should be made in the bottom of each outer cell for ventilation.

The outer cells may be left open or filled with concrete.

What I claim as new, and desire to secure by Letters Patent, is—

The improved building-tile, having the open inner cell A and the outer cell B provided with a bottom, substantially as described.

In testimony that I claim the foregoing I have hereunto set my hand this 27th day of March, 1873.

FRANCIS W. COLBY.

Witnesses:
H. N. RYON,
D. RUDE.